United States Patent
Nachum

(10) Patent No.: US 9,571,296 B2
(45) Date of Patent: Feb. 14, 2017

(54) METHODS AND APPARATUSES FOR ABSTRACTING FILTERS IN A NETWORK VISIBILITY INFRASTRUCTURE

(71) Applicant: Youval Nachum, Holon (IL)

(72) Inventor: Youval Nachum, Holon (IL)

(73) Assignee: IXIA, Calabasas, CA (US)

( * ) Notice: Subject to any disclaimer, the term of this patent is extended or adjusted under 35 U.S.C. 154(b) by 0 days.

(21) Appl. No.: 14/266,660

(22) Filed: Apr. 30, 2014

(65) Prior Publication Data

US 2015/0319070 A1  Nov. 5, 2015

(51) Int. Cl.
*H04L 12/26* (2006.01)
*H04L 12/851* (2013.01)
*H04L 12/46* (2006.01)

(52) U.S. Cl.
CPC ........... *H04L 12/26* (2013.01); *H04L 12/4633* (2013.01); *H04L 43/12* (2013.01); *H04L 43/50* (2013.01); *H04L 47/2408* (2013.01)

(58) Field of Classification Search
CPC .. H04L 41/0816; H04L 43/0876; H04L 43/04; H04L 43/062; G06N 99/005
See application file for complete search history.

(56) References Cited

U.S. PATENT DOCUMENTS

| | | | |
|---|---|---|---|
| 5,343,473 A | 8/1994 | Cidon et al. | |
| 5,867,763 A | 2/1999 | Dean et al. | |
| 6,130,887 A | 10/2000 | Dutta | |
| 6,505,255 B1 | 1/2003 | Akatsu et al. | |
| 6,678,250 B1 | 1/2004 | Grabelsky et al. | |
| 6,907,001 B1 | 6/2005 | Nakayama et al. | |
| 7,286,652 B1 | 10/2007 | Azriel et al. | |
| 7,424,018 B2 | 9/2008 | Gallatin et al. | |
| 7,515,650 B1 | 4/2009 | Warner et al. | |
| 7,596,356 B2 | 9/2009 | Rofougaran et al. | |
| 7,873,702 B2 | 1/2011 | Shen et al. | |
| 7,945,216 B2 | 5/2011 | Rakshani et al. | |
| 8,102,783 B1 | 1/2012 | Narayanaswamy et al. | |
| 8,134,927 B2 | 3/2012 | Gamage et al. | |
| 8,248,928 B1 | 8/2012 | Wang et al. | |
| 8,306,063 B2 | 11/2012 | Erdal et al. | |
| 8,446,916 B2 | 5/2013 | Aybay et al. | |
| 9,270,542 B2 | 2/2016 | Gamage et al. | |
| 2002/0073136 A1 | 6/2002 | Itoh et al. | |
| 2003/0172123 A1 | 9/2003 | Polan et al. | |

(Continued)

FOREIGN PATENT DOCUMENTS

WO   WO 2011/133711 A2   10/2011

OTHER PUBLICATIONS

Non-Final Office Action for U.S. Appl. No. 14/266,668 (Feb. 1, 2016).

(Continued)

*Primary Examiner* — Jung-Jen Liu
(74) *Attorney, Agent, or Firm* — Jenkins, Wilson, Taylor & Hunt, P.A.

(57) ABSTRACT

Embodiments of the invention disclose methods for managing visibility filters in a plurality of network visibility infrastructure elements of a visibility network such that these network visibility infrastructure elements and their filters are managed as a network and filter configuring, packet replication, and redundancy are implemented efficiently from a centralized filter control module.

20 Claims, 6 Drawing Sheets

(56) References Cited

U.S. PATENT DOCUMENTS

| | | | |
|---|---|---|---|
| 2004/0015613 | A1 | 1/2004 | Ikeda |
| 2005/0282502 | A1 | 12/2005 | Kursula et al. |
| 2006/0294221 | A1 | 12/2006 | Graupner et al. |
| 2007/0189272 | A1 | 8/2007 | Hutchinson et al. |
| 2008/0052784 | A1 | 2/2008 | Wiley et al. |
| 2008/0170561 | A1 | 7/2008 | Halbraich et al. |
| 2008/0190639 | A1 | 8/2008 | Baran et al. |
| 2009/0182874 | A1 | 7/2009 | Morford et al. |
| 2009/0190589 | A1 | 7/2009 | Bains et al. |
| 2010/0135164 | A1 | 6/2010 | Rofougaran |
| 2011/0026406 | A1 | 2/2011 | Gamage et al. |
| 2011/0026521 | A1 | 2/2011 | Gamage et al. |
| 2011/0264797 | A1 | 10/2011 | Matityahu et al. |
| 2012/0181540 | A1 | 7/2012 | Udagawa et al. |
| 2013/0272135 | A1* | 10/2013 | Leong ............... H04L 41/0823 370/241 |
| 2015/0009994 | A1 | 1/2015 | Keesara et al. |
| 2015/0113133 | A1* | 4/2015 | Srinivas ............ H04L 41/0816 709/224 |
| 2015/0113143 | A1 | 4/2015 | Stuart et al. |
| 2015/0319049 | A1 | 11/2015 | Nachum |
| 2016/0226752 | A1 | 8/2016 | Gamage et al. |

OTHER PUBLICATIONS

Commonly-assigned, co-pending U.S. Appl. No. 15/012,801 for "Apparatus and Methods for Forwarding Data Packets Captured From a Network," (Unpublished, filed Feb. 1, 2016).
Notice of Allowance and Fee(s) Due and Examiner-Initiated Interview Summary for U.S. Appl. No. 12/533,957 (Aug. 7, 2015).
Non-Final Office Action for U.S. Appl. No. 12/533,957 (Nov. 17, 2014).
Final Office Action for U.S. Appl. No. 12/533,957 (Feb. 28, 2014).
Interview Summary for U.S. Appl. No. 12/533,957 (Jan. 24, 2014).
"OpenFlow Switch Specification," Open Networking Foundation, Version 1.4.0 (VVire Protocol 0x05), pp. 1-206 (Oct. 14, 2013).
Non-Final Office Action for U.S. Appl. No. 12/533,957 (Sep. 12, 2013).
Final Office Action for U.S. Appl. No. 12/533,957 (Jan. 2, 2013).
Non-Final Office Action for U.S. Appl. No. 12/533,957 (May 11, 2012).
Notice of Allowance and Fee(s) Due for U.S. Appl. No. 12/533,951 (Nov. 8, 2011).
Final Office Action for U.S. Appl. No. 12/533,957 (Oct. 31, 2011).
Interview Summary for U.S. Appl. No. 12/533,957 (Aug. 31, 2011).
Non-Final Office Action for U.S. Appl. No. 12/533,957 (Aug. 2, 2011).
Interview Summary for U.S. Appl. No. 12/533,951 (Jul. 28, 2011).
Non-Final Office Action for U.S. Appl. No. 12/533,951 (Feb. 18, 2011).
Agilent Technologies, "Agilent N2X: The Industry's Most Comprehensive Multiservices Test Solution for Converging Network Infrastructures," 5989-1244EN, pp. 1-6 (Feb. 1, 2006).
Agilent Technologies, "Agilent N2X PITV Quality of Experience Test Solution," N5570A and E7877A Technical Data Sheet, 5989-3440EN, pp. 1-12 (Jul. 21, 2006).
Agilent Technologies, "True Router Performance Testing: Agilent Technologies Router Tester Application Note," 5980-1421E, Rev. A, pp. 1-8 (May 2000).
Letter from lxia to Agilent Technologies re: Notice of Indemnification Claims/Dispute pp. 1-2 (Nov. 9, 2010).
Letter from Agilent Technologies to lxia re: Notice of Indemnification Claims/Dispute, pp. 1-2 (Oct. 28, 2010).
Letter from lxia to Agilent Technologies re Notice of Erroneously Assigned Patent Applications and Request for Executed Assignment, pp. 1-2 (Oct. 22, 2010).
Letter from Agilent Technologies to lxia re: Notice of Erroneously Assigned Patent Application and Request for Executed Assignment, pp. 1-2 (Oct. 8, 2010).
"Radware's Smart IDS Management, FireProof and Intrusion Detection System, Deployment and ROI," Radware, Inc. pp. 1-9 (Aug. 21, 2002).
Edwards, "Vulnerabilities of Network Intrusion Detection Systems: Realizing and Overcoming the Risks, the Case for Flow Mirroring," Top Layer Networks, pp. 1-18 (May 1, 2002).
Non-Final Office Action for U.S. Appl. No. 13/092,671 (Jun. 2, 2016).
Extended European Search Report for European Patent Application No. 1172665.3 (Oct. 1, 2015).
Final Office Action for U.S. Appl. No. 13/092,671 (Nov. 6, 2014).
Non-Final Office Action of U.S. Appl. No. 13/092,671 (Apr. 23, 2014).
Final Office Action for U.S. Appl. No. 13/092,671 (May 23, 2013).
Non-Final Office Action for U.S. Appl. No. 13/092,671 (Nov. 9, 2012).
"Smart Taps Getting Smarter," Networking, Network Computing New, http://www.networkcomputing.com/networking/smart-taps-getting-smarter/1797861399, pp. 1-2 (Mar. 22, 2012).
"Command Today's Complex Data Center Challenges," Data Center, Net Optics Data Sheet, Net Optics Inc., pp. 1-4 (2011).
Notification of Transmittal of the International Search Report and the Written Opinion of the International Searching Authority, or the Declaration for International Application No. PCT/US2011/033313 (Nov. 30, 2011).
Applicant Initiated Interview Summary for U.S. Appl. No. 13/092,671 (Sep. 9, 2016).
Final Office Action for U.S. Appl. No. 14/266,668 (Aug. 25, 2016).

* cited by examiner

METHODS AND APPARATUSES FOR ABSTRACTING FILTERS IN A NETWORK VISIBILITY INFRASTRUCTURE

BACKGROUND OF THE INVENTION

The present invention relates to methods and apparatuses for improving network visibility in a network environment. More particularly, the present invention relates, in one or more embodiments, to improvements in configuring and managing network visibility infrastructures in a network environment.

A network is typically formed of, among others, a large number of switching resources (such as for example routers and switches) and links. Data, in the form of packets for example, may be sent through the links of the network. By configuring the switches appropriately, data packets may be sent from a given sender coupled to the network to a given receiver also coupled to the network although the sender and the receiver may be physically located far apart. The speed with which data packets are transferred from the sender to the receiver depends, in part, on the capacity and speed of the links as well as on the switching resources. The internet is an example of such a network and is well known, and thus its basic operating principles will not be discussed in great details herein.

Network Packet Brokers ("NPB") and network taps ("taps") and mirroring ports on switching resources have long been incorporated into networks (such as internal networks and/or the internet) to facilitate processing of data packets and/or to route data packets to/from network monitoring tools. These monitoring tools may include, for example, network analysis tools, forensic tools, various network monitoring tools, firewalls, malware prevention tools, intrusion detection tools, etc.

Generally speaking, taps are implemented at specific points in the network to access the data traffic and pass the data (whether the original data packets or the replicated copies thereof) to the monitoring tools. NPBs, on the other hand, represent hardware and/or software modules that perform, among other tasks, aggregation of monitored traffic (which again can be the original data packets or replicated copies thereof) from multiple links/segments, filtering and grooming of traffic to relieve overburdened monitoring tools, load-balancing traffic across a pool of monitoring tools, and regeneration of traffic to multiple monitoring tools. Both taps and NPBs are available from vendors such as Ixia Corporation of Calabasas, Calif.

Mirroring ports are ports implemented on the switching resources and are configured to send replicated data packets that traverse the switching resources (which may be all traversing packets or a filtered set thereof).

To facilitate discussion, FIG. 1A shows the relationship between the production network 10, the network visibility infrastructure 20, and the network monitoring tools 30.

Production network 10 represents the network of switching resources and links that is configured to transport data between the sender and the receiver. Network monitoring tools 30 performs functions that are not directly related to the transport of packets through production network 10 but are nevertheless necessary to ensure optimum performance of production network 10. These network monitoring functions include for example security, application performance monitoring (APM), network performance monitor (NPM), malware detection, intrusion detection, as well as other network management tasks. The list above is not inclusive, and these network monitoring functions are known to those skilled in the art.

Network visibility infrastructure comprises for example the taps, the network packet brokers, and the mirroring ports (e.g., SPAN™ ports from Cisco Corporation of San Jose, Calif.) that are disposed at various nodes in production network 10 to obtain data packets or copies thereof for use by network monitoring tools 30.

FIG. 1B shows a typical network configuration in which a plurality of network devices (such as routers or switches) 102A, 102B, 102C, 102D, 102E, 102F and 102G are shown communicatively coupled to NPB 104. These network devices represent some of the switching resources that direct traffic from one user to another via the network.

The couplings between network devices 102A-102C with NPB 104 are accomplished using respective mirroring ports 106A-106C (such as a SPAN or Switch Port Analyzer ports in the terminology of vendor Cisco Corporation of San Jose, Calif.) on the network devices. Data packets traversing each of NDs 102A-102C may be replicated and provided to respective mirroring ports, which packets are then provided on respective links 108A-108C to respective ingress ports (not shown) of NPB 104. In this configuration, NPB 104 is said to be connected in an out-of-band configuration with respect to packets traversing NDs 102A-102C since the original packets continue on their way without traversing NPB 104 while NPB 104 receives the replicated packets from NDs 102A-102C for forwarding to one or more of the monitoring tools 122 and 124.

Packets traversing between ND 102D and ND 102E can be tapped by tap 110, which is coupled to both NDs 102D and 102E. In one example, the packets from NDs 102D and 102E may be duplicated by tap 110 and provided to NPB 104 via links 108D and 108E respectively. In this configuration, NPB 104 is said to be connected in an out-of-band configuration with respect to packets traversing NDs 102D and 102E since the original packets continue on their way without traversing NPB 104 while NPB 104 receives the replicated packets from NDs 102D-102E.

In another example, the packets from ND 102D may be intercepted by tap 108 and redirected by tap 108 to NPB 104 and from NPB 104 to one or more of the monitoring tools for further forwarding to an analysis tool (such as analyzer 120) before being routed to ND 102E if the result of the analysis indicates that such routing is permissible. Malware detection may be one such type of analysis. In this configuration, NPB 104 is said to be connected in an in-line configuration since NPB 104 is in the data path between ND 102D and ND 102E and packets must traverse NPB 104 before reaching the destination.

FIG. 1B also shows a port aggregator 126, which aggregates packet traffic from NDs 102F and 102G to provide the aggregated packets to NPB 104 via link 124. Again, NPB 104 can be connected in-line with respect to the communication between NDs 102F and 102G (i.e., NPB 104 can be in the network data path), or NPB 104 can be connected in an out-of-band manner with respect to the communication between NDs 102F and 102G (i.e., NPB 104 receives only the replicated packets and the original packets continue on their way without traversing NPB 104).

Although only a few of the switching resources (e.g., network devices) are shown in FIG. 1B, it should be understood that a typical network may involve hundreds or thousands of these switching resources. Configuring and managing such a large number of switching resources are huge problems for network operators, and thus network operators have turned to technologies such as Software Defined Networks (SDNs) to ease the task of configuring and managing the switching resources.

Generally speaking, SDN decouples the switching hardware (e.g., the actual packet processors or network processors that perform the switching) from the control plane (implemented at least by the operating system and may include applications). Without decoupling, each network resource (such as a switch or a router) would have its own forwarding hardware controlled by its own applications executing on its own operating system. Any change in the configuration and management of the network or links thereof tends to involve reconfiguring a large number of associated switching resources using local applications executed on each of the switching resources.

SDN implements an abstracted operating system/control module and applications are executed on this abstracted operating system. The switching hardware circuitry and some control logic (e.g., packet processors or network processors) are implemented locally at each of the switching resources. The applications/abstracted operating system communicate with the switching hardware at each of the switching resources via well-established standard, such as OpenFlow™ (Open Software Foundation (ONF), https://www.opennetworking.org).

In SDN, if a change needs to be made to an application and/or to the operating system, it is no longer necessary to make the change on each of the switching resources. Instead, the change can be made at the centralized applications and/or the abstracted operating system, thereby simplifying configuration and/or maintenance. To put it differently, SDN permits the network operator to configure and manage the switching resources of the network from a centralized location using a software-centric paradigm.

Although taps, network packet brokers, and mirroring ports are also disposed throughout the network, these network visibility resources are not considered switching resources and thus far, there has been no way to manage the network visibility infrastructures as an integrated network. There is, however, a need to also reduce the configuration and/or maintenance burden associated with implementing a large number of these network visibility resources over vast distances as well as to better integrate network visibility into network traffic management and routing. Addressing these needs are one among many goals of embodiments of the present invention.

SUMMARY OF SOME EMBODIMENTS OF THE INVENTION

The invention relates, in an embodiment, to a method for managing visibility filters in a plurality of network visibility infrastructure elements of a visibility network. The plurality of network visibility infrastructure elements is configured for redirecting packets to monitoring tools. The packets represent packets transmitted by a switching network or packets generated from the packets transmitted by the switching network. The method includes providing a plurality of filters, wherein at least one filter of the plurality of filters is associated with each of the plurality of network visibility infrastructure elements. The method also includes providing a centralized filter control module that has information pertaining network ports, tool ports, and visibility element ports of the plurality of network visibility infrastructure elements. The centralized filter control module is disposed remotely from and communicably coupled with each of the plurality of filters. The method further includes configuring the filters by specifying, for each of the filters, information pertaining to network port, filter parameters, action to be taken, and tool port, wherein the configuring is performed using the centralized filter control module.

In another embodiment, the invention relates to a method for managing packet duplication in a plurality of network visibility infrastructure elements of a visibility network. The plurality of network visibility infrastructure elements is configured for redirecting packets to monitoring tools. The packets represent packets transmitted by a switching network or packets generated from the packets transmitted by the switching network. The method includes providing the plurality of network visibility infrastructure elements. The method also includes providing a plurality of filters, wherein at least one filter of the plurality of filters is associated with each of the plurality of network visibility infrastructure elements. The method further includes providing a centralized filter control module that has information pertaining ports of the plurality of network visibility infrastructure elements. The centralized filter control module is disposed remotely from and communicably coupled with each of the plurality of filters. The method yet also includes implementing hierarchical packet duplication, using the centralized filter control module, such that if a packet is destined toward multiple destination ports of the plurality of network visibility infrastructure elements, the packet is duplicated only by the network visibility infrastructure element disposed immediately before physical paths toward the direction of the multiple destination ports diverge and such that multiple copies of the packet do not traverse the same physical hop between two network visibility infrastructure elements while being transmitted between an origination port of one of the plurality of network visibility infrastructure elements toward the multiple destination ports.

In yet another embodiment, the invention relates to a method for implementing redundancy in a visibility network, which has a plurality of network visibility infrastructure elements configured for redirecting packets to monitoring tools. The packets represent packets transmitted by switching elements of a switching network or packets generated from the packets transmitted by switching elements of the switching network. The method includes providing the plurality of network visibility infrastructure elements. The method also includes providing a plurality of filters, wherein at least one filter of the plurality of filters is associated with each of the plurality of network visibility infrastructure elements. The method further includes providing a centralized filter control module, wherein the centralized filter control module has information pertaining ports of the plurality of network visibility infrastructure elements. The centralized filter control module is disposed remote from and communicably coupled with each of the plurality of filters. The method yet also includes ascertaining, utilizing the information, whether communication between a given switching element of the switching network and a given monitoring tool of the monitoring tools has multiple possible paths. The method yet further includes switching from a first path of the multiple possible paths to a second path of the multiple possible paths if the communication using first path experiences failure.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1A:
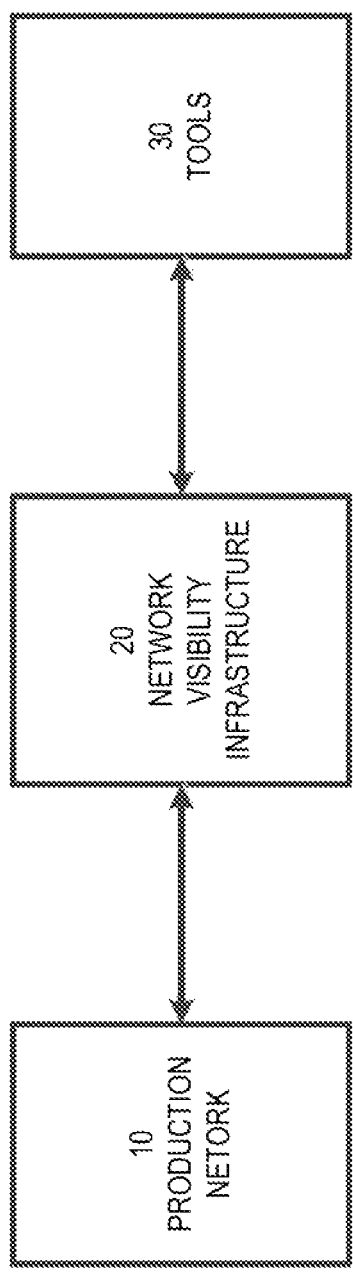
FIG. 1A shows the relationship between the production network, the network visibility infrastructure, and the network monitoring tools.
Figure 1B:
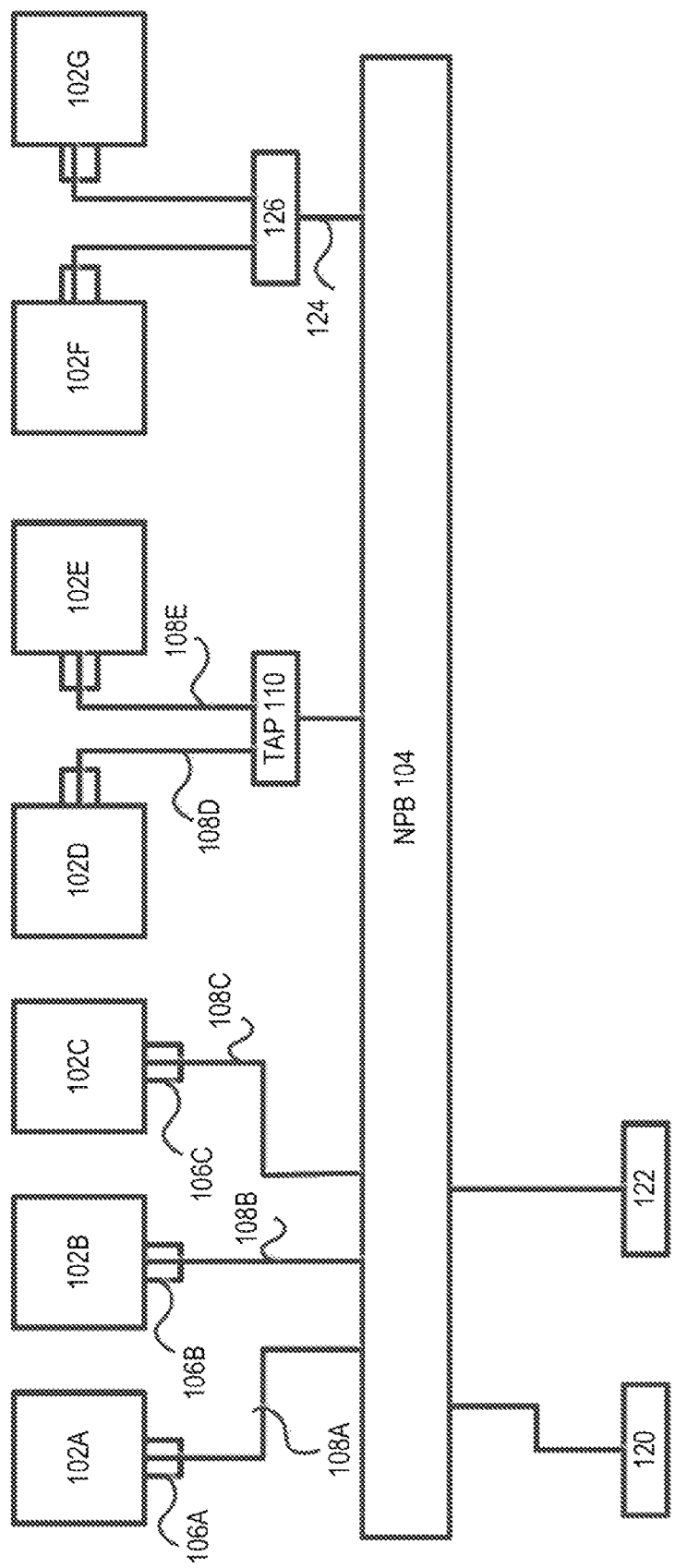
FIG. 1B shows a typical network configuration in which a plurality of network devices (such as routers or switches) are shown communicatively coupled to a NPB to facilitate discussion.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Embodiments of the invention relate to methods and apparatus for implementing and managing the network visibility infrastructure elements as a network. As the term is employed herein, the network visibility infrastructure elements include the resources that provide original, redirected, or replicated packets to network monitoring tools. In this disclosure, taps, network packet processors and mirroring ports are employed as examples of the network visibility infrastructures although these examples are not limiting. The monitoring tools may include, for example and without limitation, network analysis tools, forensic tools, various network monitoring tools, firewalls, malware prevention tools, intrusion detection tools, etc.

In one or more embodiments, the control plane is decoupled from the forwarding hardware plane of the network visibility infrastructure element such that the control plane may be abstracted. By abstracting the control plane and the application plane from the actual forwarding hardware at each of the network visibility infrastructure elements, it is possible to modularize the architecture such that while the forwarding hardware still resides at each of the network visibility infrastructure elements dispersed throughout the network, the operating system and the applications may be abstracted and remotely located.

Application Programming Interfaces (APIs) and interoperability modules are established between the abstracted operating system and the forwarding hardware such that the forwarding hardware can be readily provisioned on a plug-and-play basis at the network visibility infrastructure elements as long as they comply with the APIs and pre-established logical architecture. Communication between the abstracted operating system and its associated forwarding hardware may follow a standard analogous to, for example, OpenFlow™.

The centralization of the control elements associated with the abstracted operating system, which may be implemented remote from the network visibility resource elements themselves, provides opportunities for more efficient configuration and management of the network visibility resource elements as well as integrated with existing SDNs.

These and other features and advantages of embodiments of the invention may be understood with reference to the figures and discussions that follow.

Figure 2:
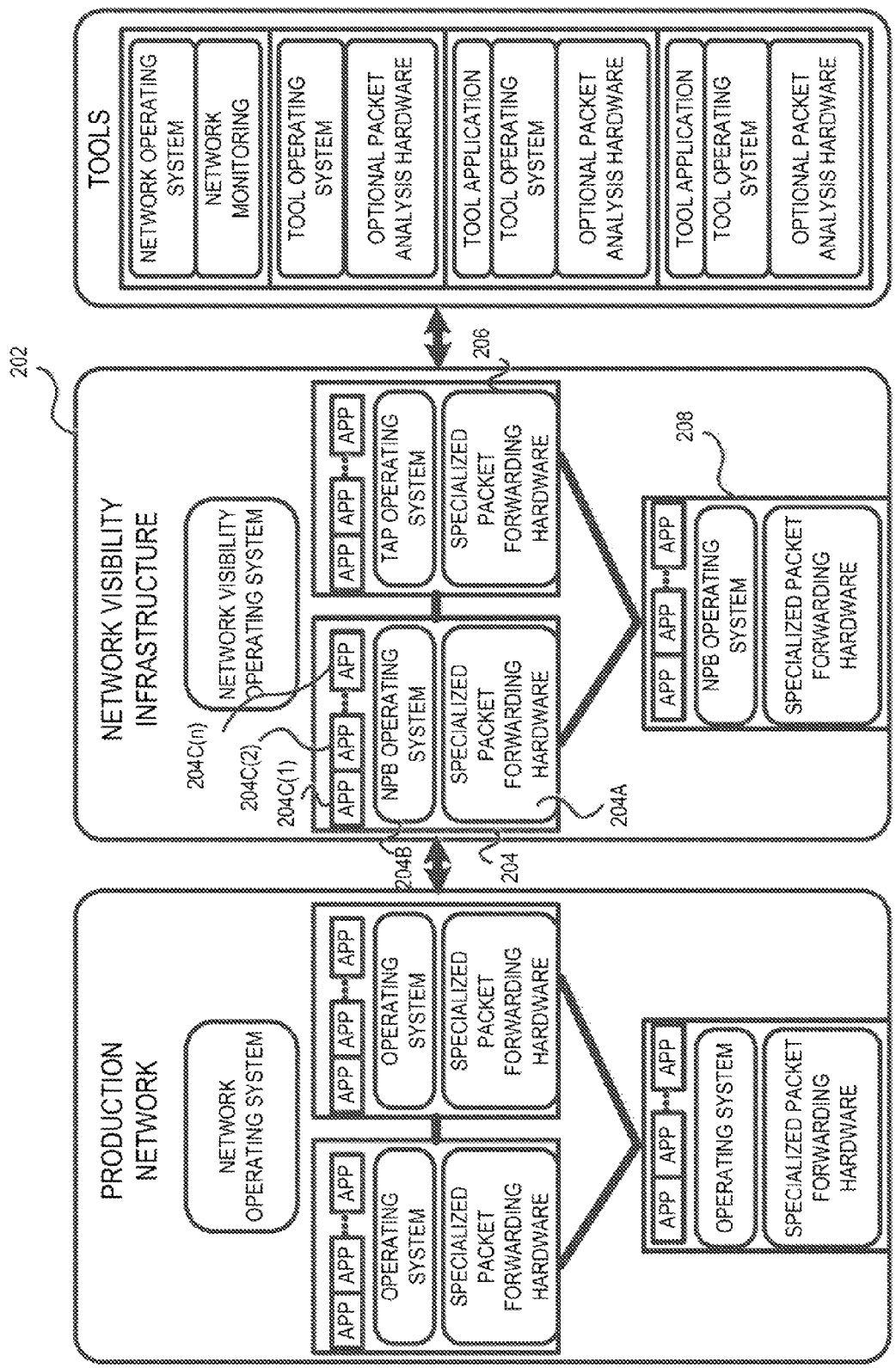
FIG. 2 shows in accordance with an embodiment an example NPB arrangement that involves original and/or replicated packets to facilitate discussion.

FIG. 2 conceptually shows, for discussion purposes, a typical network visibility infrastructure in greater details. The network visibility infrastructure 202 of FIG. 2 comprises 3 example network visibility infrastructure elements: NPB 204, tap 206, and NPB 208. As shown, each of NPB 204, tap 206, and NPB 208 includes specialized packet forwarding hardware. NPB 204 includes for example specialized packet forwarding hardware 204a, which represents the circuitry for forwarding packets onto the monitoring tools for example. NPB 204 also includes an NPB operating system 204b, which is typically disposed in the same chassis employed to house specialize packet forwarding hardware 204a. Applications 204c(1)-204c(n) represent applications executing on NPB OS 204b and may perform functions such as filter setting. Tap 206 and NPB 208 are configured analogously.

In the example of FIG. 2, since the operating system (such as 204b) is implemented locally at the network visibility infrastructure element (such as NPB 204), the control plane and the hardware forwarding plane (including for example the forwarding hardware 204a) are tightly coupled. If changes to the OS are required, these changes need to be made at each operating system 204b of each NPB.

Further, since the applications (such as 204c(1)) is implemented locally at the network visibility infrastructure element (such as NPB 204) and executes on the operating system disposed locally, the application plane and the forwarding plane (including for example the forwarding hardware 204a) are also tightly coupled. If changes to the application are required, these changes need to be made to the application program installed in each NPB.

Further, since each network visibility infrastructure element is treated as a stand-alone component in the sense that they are not coordinated with one another, it is difficult to manage the network visibility infrastructure elements as a network. As well, it is difficult to obtain a network-wide view of the network from the independently operating network visibility infrastructure elements. Still further, coordination among the network visibility infrastructure elements for purposes such as load balancing and conflict resolution between network requirements and tool capabilities are cumbersome and difficult, if not impossible.

Figure 3:
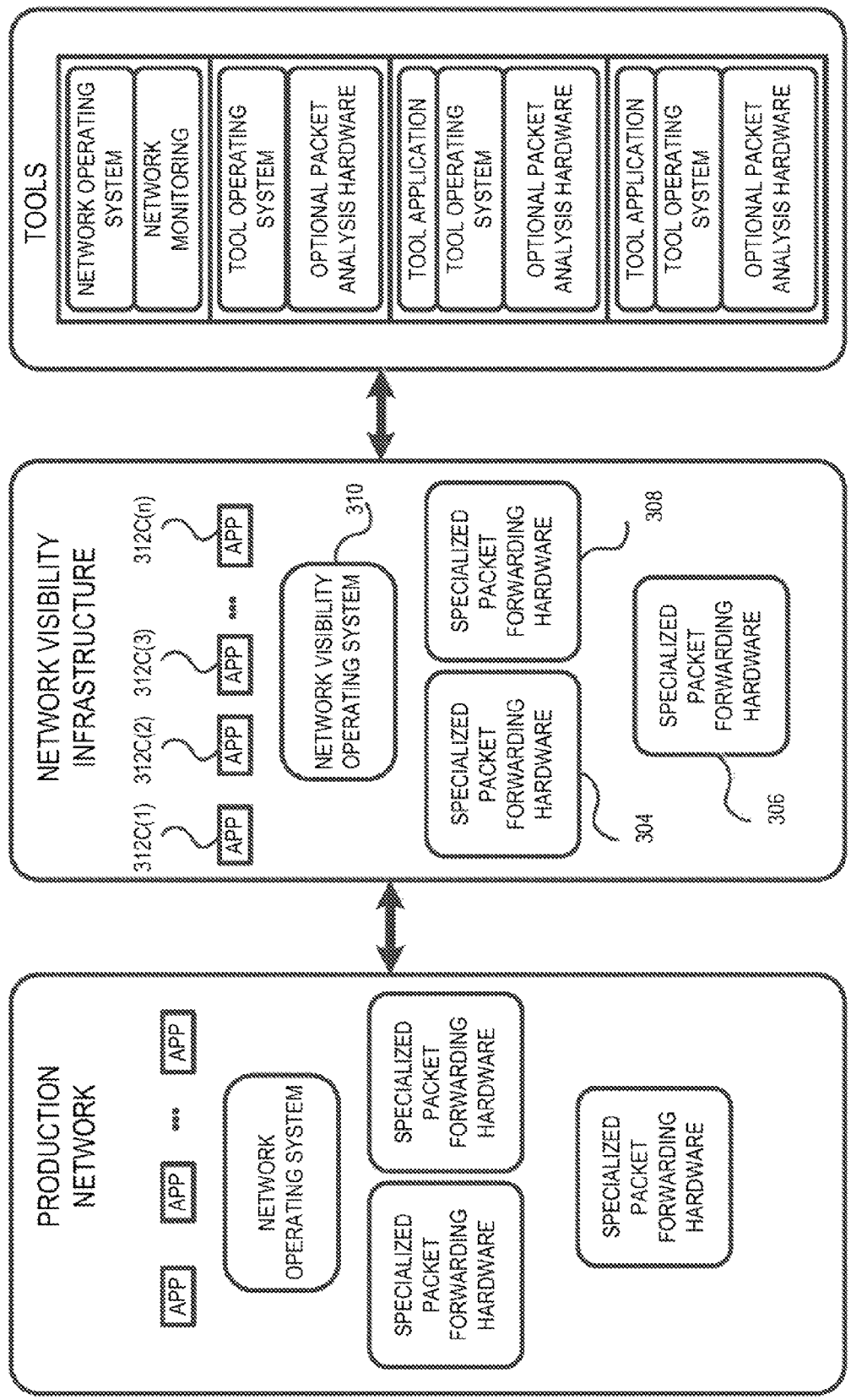
FIG. 3 shows some example queues for use with SLA packets and packets destined for monitoring tools.

FIG. 3 shows, in accordance with an embodiment of the invention, the improved network visibility infrastructure wherein the control and application planes are decoupled from the forwarding hardware at the network visibility infrastructure element and abstracted as centralized software to simplify provisioning, configuration, and management of the network visibility infrastructure. As shown in FIG. 3, network visibility infrastructure 302 also includes three example network visibility infrastructure elements 304, 306, and 308. Network visibility infrastructure elements 304, 306, and 308 may represent any combination of taps and/or network packet brokers and/or mirroring ports (e.g., SPAN ports).

In contrast to the arrangement of FIG. 2, the operating system (i.e., control plane) of the network visibility infrastructure elements has been abstracted from the network visibility infrastructure elements and implemented as a software-implemented network operating system 310 (such as on an actual or virtual server). Applications, such as 312c(1)-312c(n), execute on this software-implemented network operating system 310 and thus do not need to be executing at each network visibility infrastructure element.

The abstracted network visibility infrastructure operating system 310 communicates with each of the network visibility infrastructure elements using pre-defined APIs (Application Programming Interface) such that any forwarding hardware complying to the API can be employed for network visibility purposes. In this manner, the network visibility infrastructure elements can be provisioned on a plug-and-play basis at any location on the network and configuration and/or maintenance of these network visibility infrastructure elements may be performed at a central location via applications executing on the abstracted network visibility infrastructure operating system.

It should be understood that it is not absolutely required that all operating system functionalities of the network visibility infrastructure elements be abstracted. In one or more embodiments, the network visibility infrastructure operating system may implement some operating system functionalities, and software and/or firmware local to the network visibility infrastructure elements may implement other operating system functionalities. Preferably, the network visibility infrastructure operating system implements functionalities that can benefit from centralization (such as for example and without limitation custom parameter settings for the network visibility infrastructure elements and/or the tools) while software and/or firmware local to the network visibility infrastructure elements may implement other operating system functionalities that would be more beneficially implemented locally (e.g., to reduce demand on network bandwidth and to facilitate fast provisioning). The exact allocation of operating system functionalities between local software/firmware and network visibility infrastructure operating system can vary as desired.

In one or more embodiments, the communication to/from the forwarding hardware and/or the network visibility infrastructure operating system in the control plane is accomplished by implementing a common logical architecture for the network visibility functions (including for example all or some of the functions to provision, to configure, to communicate with and/or to maintain the network visibility infrastructure and/or the network monitoring tools). For actual communication between the controlling function (e.g., the aforementioned abstracted network visibility infrastructure operating system) and the forwarding hardware, APIs and protocols may be predefined in advance. In this manner, any forwarding hardware communicating using the common logical architecture and API/protocol may communicate with the abstracted network visibility infrastructure operating system and vice versa.

In an embodiment, the inventor herein realizes that although the OpenFlow™ standard for software defined networks (See OpenFlow Switch Specification, published by the Open Networking Foundation (ONF) https:/www.opennetworking.org) does not contemplate the visibility infrastructure as a network, the visibility infrastructure could benefit from being configured and managed as a network that co-exists with the OpenFlow™ managed switching network. To this end, the OpenFlow™ protocol and logical architecture are augmented to also be employed to configure and manage the visibility infrastructures (i.e., the taps, NPBs, and mirroring ports) that have heretofore been regarded as stand-alone devices by OpenFlow™.

In one or more embodiments, extensions are made to the logical architecture of OpenFlow™ and the OpenFlow™ specification is augmented with APIs and logical models for communicating with the modular forwarding hardware of the network visibility infrastructure elements and with the abstracted control plane of the network visibility infrastructure. In this manner, OpenFlow™ can be used to configure and manage both the switching network and the network visibility infrastructure.

For example, there are APIs that exist in OpenFlow™ that can be used as is at network visibility infrastructure such as packet redirecting to a destination port. There are also OpenFlow™ functionalities such as redirecting packets to a LAG (link aggregation port) that can be used at the network visibility infrastructure device as a load balancing group. There are APIs that need to be added to OpenFlow™ such as strict load balancing group where traffic distribution is consistent upon link failure.

Figure 4:
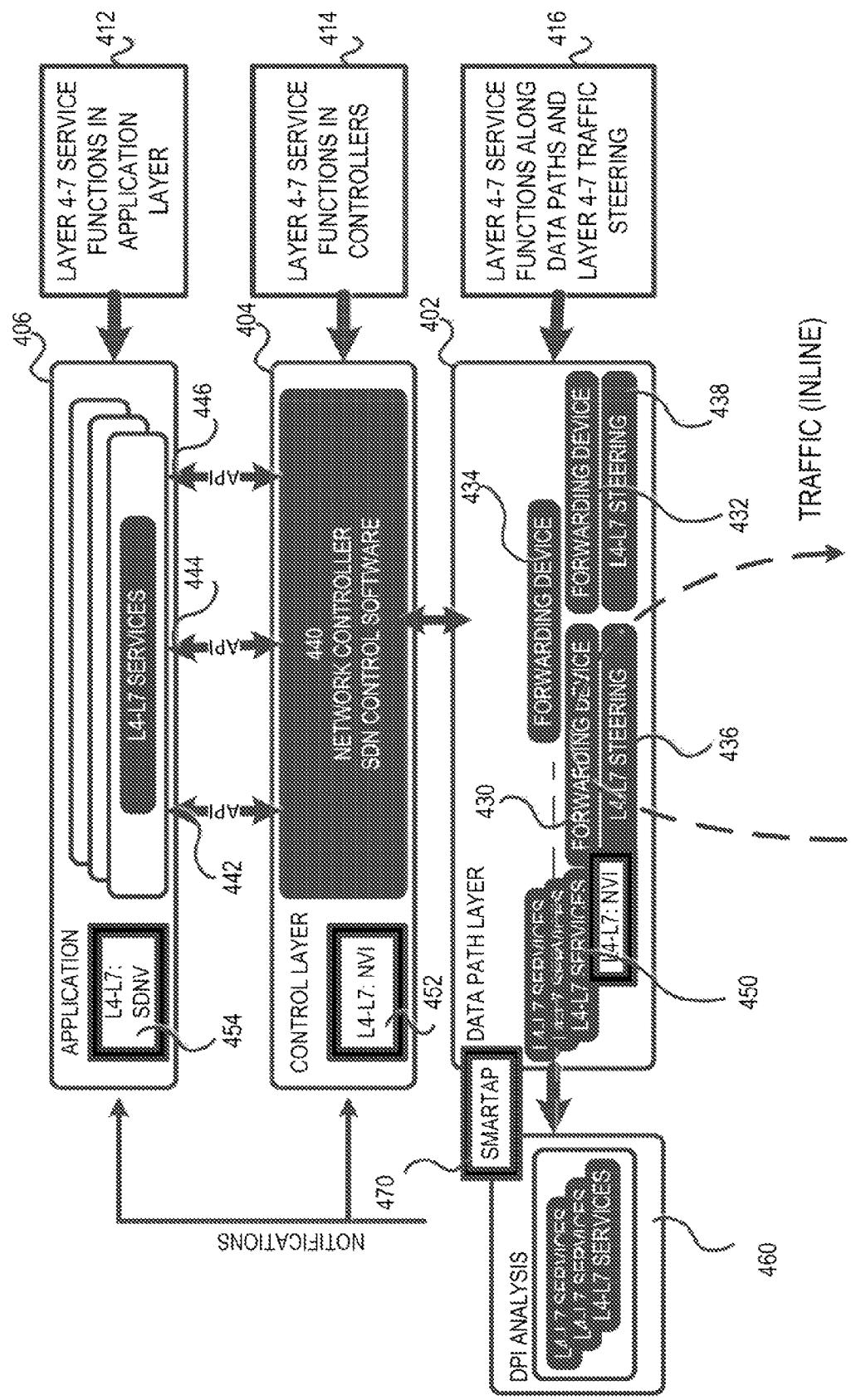
FIG. 4 shows, in an example, the method steps for implementing SLA maintenance and traffic management (e.g., to comply with the requirements and/or capabilities of the tools/networks) in NPBs.

FIG. 4 shows, in accordance with an embodiment of the invention, a conceptual view of the logical architecture of the network visibility infrastructure when managed as a network. Conceptually speaking, there are three layers: Data path layer 402, control layer 404, and application layer 406. These layers mirror the conceptual architecture of software defined networks implementing OpenFlow™ for switching networks. Layer 4-Layer 7 (L4-7) services functions are implemented in all 3 layers (412, 414, and 416). Forwarding hardware modules 430, 432, and 434 are also shown, along with associated L4-7 steering modules 436 and 438.

Additionally, there is implemented a network controller/SDN control software 440, which implements the control layer Operating System and the aforementioned logical architecture and APIs necessary to allow the control layer Operating System to be abstracted from the data path forwarding hardware and to facilitate communication between the control layer Operating System and the data path forwarding hardware over network links. Through established APIs (442, 444, and 446), applications providing L4-L7 service functions at the application layer 406 may be executed on the abstracted Operating System of control layer 404.

Further, there are implemented Data Path Layer Interoperability module 450 and Control Layer Interoperability module 452, representing modules for communicating with the tools (shown in FIG. 4 by representative Deep Packet Analysis 460). In one or more embodiments, these modules permit direct configuration of the network visibility infrastructure. Network visibility resources (such as taps, mirroring ports, and NPBs) may be pre-allocated to the monitoring tools if desired. As well, the tools may manage their resources directly without involvement of the applications at the application layer 406 and 454(SDNV). For example, filter configuration, bandwidth management, the management and configuration of tunnels, packet attributes, threshold crossing alerts as well as other alerts, may be managed without involvement of the applications at the application layer 406 and 454(SDNV). To elaborate, although SDNV is a central management of the network visibility infrastructure it is highly desired to allow a fast configuration and a dedicated resources to the tools. For example an intrusion detection tool can quickly react to a suspicious traffic and configured the NPB to redirect a specific traffic, the dedicated resource is the TCAM i.e. reserved classification entries at the NPB. This feature is possible by using the NVI 450.

There is further an Application Layer Interoperability Module 454 for facilitating communication from the monitoring tools and the production network controller to the network visibility infrastructure. In this manner, network visibility applications can directly communicate with the tools and the production network controller and configure and/or manage the network visibility infrastructure as a network. Example (not exhaustive or limiting) of such applications include filter abstraction management, network visibility SLA (Service Level Agreement) control, SmartTap™ management such as managing and configuration of tunnel, packet attributes, threshold crossing alerts as well as other alerts, etc. As is known, SmartTap™ (470) provides the ability to control which attributes to filter and the exact tunneling, along with simple configuration/management thereof. Further details pertaining to the SmartTap™ product may be obtained from Ixia Corporation of Calabasas, Calif.

An example advantage of having a network view or of managing the network visibility infrastructure (pertaining to the network monitoring/management function) as a network alongside the software defined network (pertaining to the switching function) is the ability to resolve conflicts between tool requirements and network requirements. For example, if the network bandwidth management SLA calls for a particular SLA requirement, and this network bandwidth SLA requirement conflicts with the tool's specification (such as bandwidth capability of the tool), a network view of the tools and the network would enable applications in the application layer to detect such discrepancy, to configure the tools to adapt (such as load balancing or additional visibility resource provisioning) to the network bandwidth SLA requirement, or to raise alerts with the network operator. This is particularly true if both the software defined network and the network visibility infrastructure follow or are based upon the OpenFlow™ standard.

As can be appreciated from the foregoing, embodiments of the invention define and implement a network visibility infrastructure that can be configured and managed as a network based on the open network concept and the OpenFlow™ standard. With this approach, both the switching network and the network visibility infrastructure can be managed as networks and more importantly, can be managed together to consolidate network and tool requirements/capabilities to provide greater insight into network operation as well as flexibility and efficiency as far as detecting conflicts, configuration and management of the network visibility infrastructure elements as well as configuration and management of the monitoring tools.

Furthermore, one or more embodiments of the invention decouple the control and forwarding functions of the network visibility infrastructure elements (such as taps and NPBs) to allow abstraction of the control layer. One or more embodiments of the invention enable network visibility control to be directly programmable and the underlying infrastructure to be abstracted for network visibility services. By adopting the software defined network concept and the OpenFlow™ standard, albeit slightly modified to handle the network visibility infrastructures and requirements/capabilities thereof, one or more embodiments promote a unified management capability that integrates both networks. In one or more embodiments, network control (network traffic SLA for inline packets, for example) can be directly programmable. Further, tool traffic SLA and packets attributes associated with network monitoring tools and security systems can be directly programmable.

In accordance with one or more embodiments of the invention, network visibility filters can be abstracted and managed abstractly to significantly ease the burden associated with filter provisioning and configuration.

As the term is employed herein, a visibility filter refers to a filter implemented on a network visibility infrastructure element (such as a network packet broker or tap) to classify packets, the result of the classification being the basis for further action by the network visibility infrastructure element. In the following paragraphs, network packet brokers will be employed as primary examples to discuss the details of embodiments of the visibility filter abstraction invention. However, it should be understood that principles of the invention are not limited to network packet brokers or any particular type of network visibility infrastructure element.

Visibility filters are deployed at network visibility infrastructure elements to classify packets so that the network visibility infrastructure element can ascertain what action to take with regard to the received packet. Filters can be based on the ingress port (e.g., which ingress port of the NPB received this packet?), on the source or destination MAC (Media Access Controller) address, on the source or destination IP address, on the protocol (e.g., TCP/IP versus UDP) or on any other attribute that can be ascertained from the header and/or content of packets themselves. Actions that may be taken may include, without limitation, redirecting the packet to another port, duplicating the packet, dropping the packet, counting the packet, limiting the packet, rate limit the flow associated with the packet, etc.

In the past, filter configuration has always been performed at the network visibility infrastructure element on an element-by-element basis. The network operator has to have knowledge of the identity of the network visibility infrastructure elements involved, where the network visibility infrastructure elements are implemented in the network, as well as other network connectivity parameters associated with the network visibility infrastructure element configuration.

Further, since the network visibility infrastructure elements are not managed together as a network, each NPB has to do its own classification in order to ascertain what action to take with respect to an incoming packet. When stacked NPBs are employed (i.e., when multiple NPBs are in the path between the switching network and the tool such as the case when the egress port of one NPB is coupled to the ingress port of another NPB), packet replication is not coordinated and is not always hierarchical, leading to inefficient use of NPB resources. Still further, since the network visibility infrastructure elements are not managed together as a network, the failure of a NVIE often means monitoring is unavailable or implementing alternate routing to/from the affected monitoring tools would be cumbersome and timeconsuming although there may exists other NVIEs already coupled to the switching network and/or the tools and which can serve as redundancy backups.

In accordance with one or more embodiments of the invention, the network visibility infrastructure elements (NVIE) are managed together as a network and all their ports are known to a centralized filter control module. If there are 6 NVIEs and each has 10 ports, for example, the centralized filter control module would have a network level knowledge that 60 ports exist. The centralized filter control module further has knowledge whether a given NVIE port is coupled to the switching network or to the tool network or to another NVIE (such as in a stacked NPB arrangement). This information may be ascertained by the centralized filter control module by an auto-discovery process, by registration from the NVIEs as each NVIE is coupled to the network or is powered on, or by a human operator entering the NVIE data into the centralized filter control module.

In accordance with one or more embodiments, the NVIE ports are classified into one of three types: network port, tool port, or NPB-NPB port. A network port represents a NVIE port that is coupled to the switching network (such as to a switch, or a router) to exchange data packets with the switching network. The network port represents the first NVIE port along the switching-network-to-monitoring-tool path that receives the packet.

A tool port represents a NVIE port that is coupled to the monitoring tool to exchange data packets with the monitoring tool. The tool port represents the last NVIE egress port that touches the packet before the packet is received by the monitoring tool along the switching-network-to-monitoring-tool path.

A NPB-NPB port represents an NPB port that is coupled to another NPB port for internal routing purposes among the network of NPBs. NPB-NPB ports exist because some switching-network-to-monitoring-tool path may involve traversal of multiple networked NPBs. NPB-NPB port is a subset of a class of ports known as visibility element port since visibility elements include NPBs but also includes taps, mirroring ports, etc. In the following example, NPB-NPB ports will be employed for discussion although it should be understood that embodiments of the invention also apply to visibility element ports in general.

The user may then configure a filter simply as a function of the network port, the tool port, the filtering parameters and the action to be taken. The user may then provide this filter specification to the centralized filter control module to accomplish filtering. Note that this filter abstraction does not require the user to know the identity of the NVIE(s) involved, where the NVIE(s) is/are located or how the NVIE(s) is/are connected to the rest of the network.

As an example, a filter specification may have the format of [Network Ports, Filter Parameters, Action to be Taken, Tool Ports] for packets destined from the switching network to the monitoring tools. As a concrete example, the filter may read [network port 5, IP source Address (123.11.101.42), redirected to tool port 16]. With this filter, any packet arriving at network port 5 that has the IP source address "123.11.101.42" would be redirected by the NVIE to tool port 16. Note that it is unnecessary for the user to know the exact location of the NVIE that implements network port 5 or the exact location of the NVIE that implements tool port 16 or the connectivity details of these NVIEs in order to configure and implement the filter.

Filter management is thus abstracted to four parameters: Network Port, Filter parameters, Action to be Taken, Tool Port. The centralized filter control module then computes the path to be taken, including any traversal of multiple stacked NPBs between the specified network port and the specified tool port. This computation is familiar to one skilled in the art and is possible because the centralized filter control module knowledge of all the NVIEs and their locations and their ports and manage them as a network.

If the NVIE network is inline (i.e., the data packet would be sent back to the switching network after monitoring), the filter specification for the return path may read [Tool port. Filter Parameters, Action to be Taken, Network Port]. As a concrete example, the filter may read [Tool port 11, MAC source Address (00:0a:95:9d:68:16), redirected to network port 8]. With this filter, any packet arriving at tool port 11 that has the MAC source address "00:0a:95:9d:68:16" would be redirected by the NVIE to network port 8. Again, note that it is unnecessary for the user to know the exact location of the NVIE that implements network port 8 or the exact location of the NVIE that implements tool port 11 or the connectivity details of these NVIEs to configure and implement the filter.

Filtering may take many forms, for example first match or all matches, regular expressions, programmable lookup or TCAM-based. If TCAM-based, the filtering may involve multiple lookups, packet depth parameters, TCAM entry length parameters, number of entries, and/or pre-TCAM engines (range, port group, etc.). The list is intended only as examples and not exhaustive nor limiting.

In accordance with one or more embodiments of the invention, packet classification is done only at first NVIE along the switching-network-to-monitoring-tool path for out-of-band traffic. For inline traffic, packet classification may also be done at the first NVIE along the return monitoring-tool-to-switching-network path.

Figure 5:
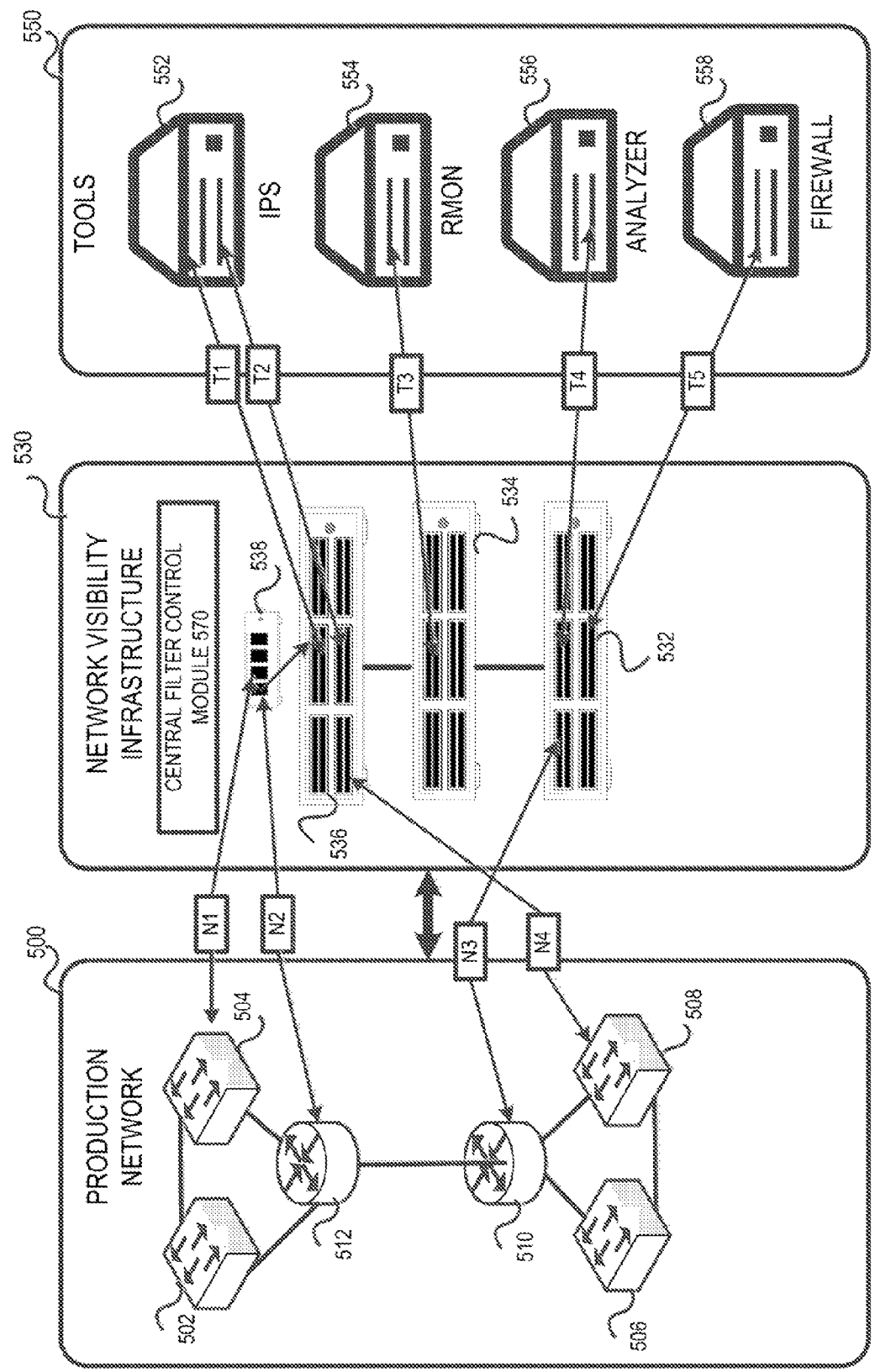
FIG. 5 shows a packet marked with indication to reflect whether the packet is an original or a replicated packet.

FIG. 5 is an example arrangement showing the network ports and the tool ports. Production (switching) network 500 comprises four switches (502, 504, 506, and 508) and 2 routers (510 and 512) interconnected to form a communication network. Network visibility infrastructure 530 comprises three NPBs (532, 534, and 536) and a tap 538. Not shown is the abstracted control plane from the forwarding plane. However, these NVIEs are managed together as a network in the manner discussed earlier.

NPB 532 is communicatively coupled to NPB 534. NPB 534 is communicatively coupled to NPB 536. NPB 536 is communicatively coupled to tap 538. Two ports (N1 and N2) of tap 538 are coupled to switch 504 and router 512 of production network 500. One port (N3) of NPB 532 is coupled to router 510 while one port (N4) of NPB 536 is coupled to switch 508.

On the tool side 550, two ports (T1 and T2) of NPB 536 are communicatively coupled to IPS (Intrusion Prevention System) 552. A port (T3) of NPB 534 is communicatively coupled to remote network monitoring (RMON) 554. A port (T4) of NPB 532 is communicatively coupled to analyzer 556 while a port (T5) of NPB 532 is communicatively coupled to firewall 558.

Central Filter Control Module 570, which is implemented as part of the remoted control plane, has knowledge of ports N1-N4 as well as ports T1-T5. Ports N1-N4 are network ports since they are communicatively coupled to switches and routers of the switching network 500, while ports T1-T5 are tool ports since they are communicatively coupled to the tools 550.

Further, if a user filter specification specifies, for example, redirecting the packet from network port N2 to tool port T4 upon satisfying the filter criteria, central filter control module 570 would be able to ascertain the path from network port N1 through tap 538 through NPB 536, NPB 534, NPB 532 and egress out tool port T4 of NPB 532 since central filter control module 570 not only has knowledge of the existence and specifications of ports N1-N4 and T1-T5 but also the connectivity details of network visibility infrastructure 530.

As mentioned, in an embodiment, only the first NVIE in the switching-network-to-monitoring-tool needs to perform the packet classification, in accordance with an embodiment. For example, if a filter specifies redirecting from network port N4 to tool port T3 and tool port T4 upon satisfying the filter criteria, only NPB 536 (associated with network port N4) needs to perform the classification to derive a unique flow ID for internal use by the network visibility infrastructure 530. Although NPB 534 and NPB 532 would be in the switching-network-to-monitoring-tool path, redirection by NPB 534 and NPB 532 may be performed based on this flow ID without the need for packet classification by NPB 534 and NPB 532.

For inline packets that need to be returned to the switching network 500 after being sent to tools 550, only the first NVIE in the monitoring-tool-to-switching-network path needs to perform the packet classification, in accordance with an embodiment. For example, if a filter specifies redirecting the packet from tool port T3 to network port N1 upon satisfying the filter criteria, only NPB 534 (associated with tool port T3) needs to perform the classification to derive a unique flow ID for internal use by the network visibility infrastructure 530. Although NPB 536 and tap 538 would be in the monitoring-tool-to-switching-network path, redirection by NPB 536 and tap 538 may be performed based on this flow ID without the need for packet classification by NPB 536 and tap 538.

In other embodiments, packet classification can be performed on a hop-by-hop basis if desired. If such is the case, there is also no need for the user to be aware of the internal structure of the Network Visibility Infrastructure.

Since the NVIEs are implemented as a network, hierarchical packet replication may be managed by the centralized filter control module. This is an advantage of managing the NVIEs as a network with abstracted control since replication can be performed more efficiently. As an example, consider a filter that specifies replicating the packet from network port N4 to tool ports T3, T4, and T5 upon satisfying the filter criteria. In this case, NPB 536 performs the classification as mentioned earlier, and redirects the packet to NPB 534. NPB 534 redirects the packet to port T3 while replicating a copy of the packet to send to NPB 532. Note that only one copy is sent to NPB 532 so save on visibility network bandwidth as well as processing cycles/time by NPB 534 although the filter specifies that both ports T4 and T5 also receive replicated packets. At NPB 532, the packet is then replicated and sent to ports T4 and T5. This hierarchical replication may be precomputed in advance by the centralized filter control module since the centralized filter control module has a network view of the NVIEs.

In this manner, if a packet needs to be replicated to multiple ports (e.g., packet A to ports B, C, and D, thus forming multiple logical paths A-B, A-C, and A-D), such packet is not replicated if the multiple logical paths traverse the same physical hop between two network visibility infrastructure elements. If the physical communication paths diverge toward different destination ports (e.g., ports B, C, or D) and it is no longer possible for the multiple logical paths to share a physical hop between two network visibility infrastructure elements, the last possible network visibility infrastructure elements shared by the multiple logical paths will perform duplication prior to sending multiple packets toward different destinations via different physical paths. One can visualize this hierarchical packet replication as traversing a root system of a tree wherein the packet to be duplicated traverses from the upper portion of the root system toward the tips of the roots and only gets replicated at the location where the root splits into two or more physical paths toward the root tips. Prior to a root split location, it is not necessary to have multiple copies traversing the same physical hop (portion of the root).

As a general rule, filters tend to be implemented only for NPBs connected to the network ports (to handle inline and out-of-band traffic to the tools) or NPBs that are connected to the tool ports (to handle inline traffic that is returned from the tools to the network). Internal ports (i.e., NPB-NPB ports) are provisioned with filters for the packet redirection functionality (to redirect packets from the switching network to the tools or to redirect packets from the tools to the switching network) and to optimize hierarchical replication of inline packets. NPB-NPB port filters may be triggered by flow ID, in one or more embodiments. In this manner, a smaller TCAM may be used to service these NPB-NPB ports since deep packet inspection is not necessary.

It should be noted that although the use of flow IDs is contemplated, embodiments of the invention also involve classification at every NVIE that needs to take action with respect to the packet it receives. Thus the use of flow IDs is an optimization and not a requirement to implement filter abstraction.

The fact that the filters are managed together as network also means that it is possible to quickly and efficiently reconfigure filters in the network visibility infrastructures to provide high availability when there are changes in the network visibility infrastructure. As an example, if there are redundant routes from a given network port to a tool port, the failure of a NPB port or an entire NPB would trigger reconfiguring the filter specification to redirect the packets along the redundant route, thereby improving overall availability of the visibility network.

As can be appreciated from the foregoing, embodiments of the invention significantly ease user and application filter configuration. By managing the NVIEs as a network and by abstracting the filters to the network ports and tool ports, the user and applications do not have to know the identity of the NVIE involved, where the NVIE is located, or the connectivity details of the network visibility infrastructure elements.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for managing visibility filters in a plurality of network visibility infrastructure elements of a visibility network, said plurality of network visibility infrastructure elements configured for redirecting packets to monitoring tools, said packets representing packets transmitted by a switching network or packets generated from said packets transmitted by said switching network, comprising:
   providing a plurality of filters, wherein at least one filter of said plurality of filters is associated with each of said plurality of network visibility infrastructure elements;
   providing a centralized filter control module, wherein said centralized filter control module has information pertaining network ports, tool ports, and visibility element ports of said plurality of network visibility infrastructure elements, said centralized filter control module being disposed remote from and communicably coupled with each of said plurality of filters;
   configuring said filters by specifying, for each of said filters, information pertaining to network port, filter parameters, action to be taken, and tool port, wherein said configuring is performed using said centralized filter control module; and
   computing, by the centralized filter control module, a path to be taken for a packet between a specified network port and a specified tool port based off of the information known to the filter control module pertaining to the network ports, the tool ports, and the visibility element ports of said plurality of network visibility infrastructure elements.

2. The method of claim 1 wherein at least one of said plurality of network visibility infrastructure elements is a tap.

3. The method of claim 1 wherein at least one of said plurality of network visibility infrastructure elements is a network packet broker.

4. The method of claim 1 wherein at least one of said plurality of filters implements filtering based on IP address.

5. The method of claim 1 wherein at least one of said plurality of filters implements filtering based on MAC address.

6. The method of claim 1 wherein at least one of said plurality of filters implements filtering based on protocol.

7. The method of claim 1 wherein said action to be taken comprises one of redirecting packet, duplicating packet, dropping packet, and counting packet.

8. The method of claim 1 wherein said centralized filter control is implemented in a control plane of a common logical architecture that is based on OpenFlow™ and that represents an extended version of OpenFlow™.

9. A method for managing packet duplication in a plurality of network visibility infrastructure elements of a visibility network, said plurality of network visibility infrastructure elements configured for redirecting packets to monitoring tools, said packets representing packets transmitted by a switching network or packets generated from said packets transmitted by said switching network, comprising:
   providing said plurality of network visibility infrastructure elements;
   providing a plurality of filters, wherein at least one filter of said plurality of filters is associated with each of said plurality of network visibility infrastructure elements;
   providing a centralized filter control module, wherein said centralized filter control module has information pertaining to ports of said plurality of network visibility infrastructure elements, said centralized filter control module being disposed remote from and communicably coupled with each of said plurality of filters;
   computing, by said centralized filter control module, a path to be taken for a packet between a specified network port and a specified tool port based off of the information known to the filter control module pertaining to the ports of said plurality of network visibility infrastructure elements; and
   implementing hierarchical packet duplication, using said centralized filter control module, such that if said packet is destined toward multiple tool ports of said plurality of network visibility infrastructure elements, said packet is duplicated only by said network visibility infrastructure element disposed immediately before physical paths toward the direction of the multiple tool ports diverge and such that multiple copies of said packet do not traverse the same physical hop between two network visibility infrastructure elements while being transmitted between said specified network port of one of said plurality of network visibility infrastructure elements toward said multiple tool ports.

10. The method of claim 9 wherein at least one of said plurality of network visibility infrastructure elements is a tap.

11. The method of claim 9 wherein at least one of said plurality of network visibility infrastructure elements is a network packet broker.

12. The method of claim 9 wherein at least one of said plurality of filters implements filtering based on IP address.

13. The method of claim 9 wherein at least one of said plurality of filters implements filtering based on MAC address.

14. The method of claim 9 wherein at least one of said plurality of filters implements filtering based on protocol.

15. The method of claim 9 wherein said centralized filter control is implemented in a control plane of a common logical architecture that is based on OpenFlow™ and that represents an extended version of OpenFlow™.

16. A method for implementing redundancy in a visibility network, said visibility network having a plurality of network visibility infrastructure elements configured for redirecting packets to monitoring tools, said packets representing packets transmitted by switching elements of a switching network or packets generated from said packets transmitted by switching elements of said switching network, comprising:
   providing said plurality of network visibility infrastructure elements;
   providing a plurality of filters, wherein at least one filter of said plurality of filters is associated with each of said plurality of network visibility infrastructure elements;
   providing a centralized filter control module, wherein said centralized filter control module has information pertaining to ports of said plurality of network visibility infrastructure elements, said centralized filter control module being disposed remote from and communicably coupled with each of said plurality of filters;
   ascertaining, utilizing said information, whether communication between a given switching element of said switching network and a given monitoring tool of said monitoring tools has multiple possible paths;
   computing, by the centralized filter control module, a first path to be taken from the multiple possible paths for a packet between a specified network port of the given switching element and a specified tool port of the given monitoring tool based off of the information known to the filter control module pertaining to the ports of said plurality of network visibility infrastructure elements; and switching from a first path of said multiple possible paths to a second path of said multiple possible paths if said communication using first path experiences failure.

17. The method of claim 16 wherein at least one of said plurality of network visibility infrastructure elements is a network packet broker.

18. The method of claim 16 wherein at least one of said plurality of filters implements filtering based on IP address.

19. The method of claim 16 wherein at least one of said plurality of filters implements filtering based on MAC address.

20. The method of claim 16 wherein at least one of said plurality of filters implements filtering based on protocol.

\* \* \* \* \*